(12) United States Patent
Burnett et al.

(10) Patent No.: US 11,774,415 B2
(45) Date of Patent: Oct. 3, 2023

(54) METERING PUMP FOR LIQUID CHROMATOGRAPHY

(71) Applicant: Waters Technologies Corporation, Milford, MA (US)

(72) Inventors: Joshua A. Burnett, Taunton, MA (US); Rose Solow, Newark, NJ (US); David A. Simpson, Hopkinton, MA (US); Peter Osswald, Douglas, MA (US); John M. Auclair, Seekonk, MA (US); Michael LeBeau, Attleboro, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 172 days.

(21) Appl. No.: 17/212,329

(22) Filed: Mar. 25, 2021

(65) Prior Publication Data
US 2021/0302397 A1 Sep. 30, 2021

Related U.S. Application Data

(60) Provisional application No. 63/000,037, filed on Mar. 26, 2020.

(51) Int. Cl.
*G01N 30/28* (2006.01)
*G01N 30/02* (2006.01)
*G01N 30/32* (2006.01)

(52) U.S. Cl.
CPC ....... *G01N 30/28* (2013.01); *G01N 2030/027* (2013.01); *G01N 2030/326* (2013.01); *G01N 2030/328* (2013.01)

(58) Field of Classification Search
CPC ................ F04B 1/00; G01N 2030/027; G01N 2030/326; G01N 2030/328; G01N 30/28
See application file for complete search history.

(56) References Cited

U.S. PATENT DOCUMENTS

| 2,702,547 A | 2/1955 | Glass |
| 3,362,339 A | 1/1968 | Eckfelt et al. |

(Continued)

FOREIGN PATENT DOCUMENTS

| CA | 2216861 C | 5/2001 |
| DE | 102012200218 A1 | 8/2012 |

(Continued)

OTHER PUBLICATIONS

International Preliminary Report on Patentability in PCT/US2021/024092 dated Oct. 6, 2022.

(Continued)

*Primary Examiner* — Harshad R Patel
*Assistant Examiner* — Gedeon M Kidanu
(74) *Attorney, Agent, or Firm* — Schmeiser, Olsen & Watts LLP; William G. Guerin

(57) ABSTRACT

Described is a metering pump that may be used to meter volumes of sample in a chromatography system. The metering pump has a modular configuration that allows for separation of a head pod from a drive assembly for easy serviceability. The head pod includes a pump head, cartridge housing, seal wash housing and plunger. The drive assembly can be implemented in an inline drive configuration. Alternatively, the drive assembly can be implemented in an offset drive configuration in which a stepper motor is displaced laterally from other drive assembly components but is coupled through a belt and pulley system.

22 Claims, 11 Drawing Sheets

(56) References Cited

U.S. PATENT DOCUMENTS

| | | | |
|---|---|---|---|
| 3,880,138 A * | 4/1975 | Wootten | A61M 5/14546 |
| | | | 600/432 |
| 4,389,163 A | 6/1983 | Magnussen, Jr. et al. | |
| RE31,586 E | 5/1984 | Magnussen, Jr. | |
| 4,859,605 A | 8/1989 | Metzger et al. | |
| 4,900,683 A | 2/1990 | Metzger et al. | |
| 4,894,345 A | 6/1990 | Metzger et al. | |
| 4,980,130 A | 12/1990 | Metzger et al. | |
| 5,322,511 A | 6/1994 | Armbruster et al. | |
| 5,656,034 A | 8/1997 | Kochersperger et al. | |
| 5,738,498 A | 4/1998 | Allington et al. | |
| 7,225,079 B2 | 5/2007 | Gjerde et al. | |
| 7,329,485 B2 | 2/2008 | Zlotnick | |
| 7,992,429 B2 | 8/2011 | Weissgerber | |
| 8,215,922 B2 | 7/2012 | Berger et al. | |
| 8,776,621 B2 | 7/2014 | Modic et al. | |
| 9,163,618 B2 | 10/2015 | Wikfors et al. | |
| 10,054,569 B2 | 8/2018 | Song et al. | |
| 10,272,196 B2 | 4/2019 | Smith et al. | |
| 10,760,557 B1 | 9/2020 | Babcock | |
| 10,802,001 B2 | 10/2020 | Burnett et al. | |
| 2003/0165941 A1 | 9/2003 | Gjerde et al. | |
| 2005/0020980 A1 * | 1/2005 | Inoue | A61M 39/10 |
| | | | 604/152 |
| 2007/0082359 A1 | 4/2007 | Zlotnick | |
| 2010/0040483 A1 | 2/2010 | Berger et al. | |
| 2010/0224012 A1 | 9/2010 | Modic et al. | |
| 2011/0301566 A1 | 12/2011 | Schaefer | |
| 2013/0048095 A1 | 2/2013 | Wikfors et al. | |
| 2017/0138913 A1 * | 5/2017 | Nocon | G01N 30/32 |
| 2018/0364203 A1 | 12/2018 | Burnett et al. | |
| 2020/0064314 A1 | 2/2020 | Sievers-Engler | |
| 2020/0088221 A1 * | 3/2020 | Musacchio | F15B 15/18 |

FOREIGN PATENT DOCUMENTS

| | | | | |
|---|---|---|---|---|
| EP | 0259257 A2 | 3/1988 | | |
| EP | 0259259 A2 | 3/1988 | | |
| EP | 0871875 B1 | 6/2002 | | |
| EP | 2677313 A1 | 12/2013 | | |
| EP | 2310683 B1 | 6/2018 | | |
| EP | 3403680 A1 | 11/2018 | | |
| EP | 3617701 A1 | 3/2020 | | |
| EP | 3642613 B1 | 3/2021 | | |
| EP | 0871875 B1 * | 6/2022 | | G01N 30/36 |
| GB | 2540307 B | 8/2020 | | |
| WO | 1987002139 A1 | 4/1987 | | |
| WO | 1996030757 A2 | 10/1996 | | |
| WO | 2001046687 | 6/2001 | | |
| WO | 2005000378 A2 | 1/2005 | | |
| WO | WO-2005000378 A2 * | 1/2005 | | A61M 39/10 |
| WO | 2010008851 A1 | 1/2010 | | |
| WO | 2010102061 A1 | 9/2010 | | |
| WO | 2013136802 A1 | 9/2013 | | |
| WO | 2018236641 A1 | 12/2018 | | |

OTHER PUBLICATIONS

International Search Report and Written Opinion in PCT/US2021/024092 dated May 21, 2021.

* cited by examiner

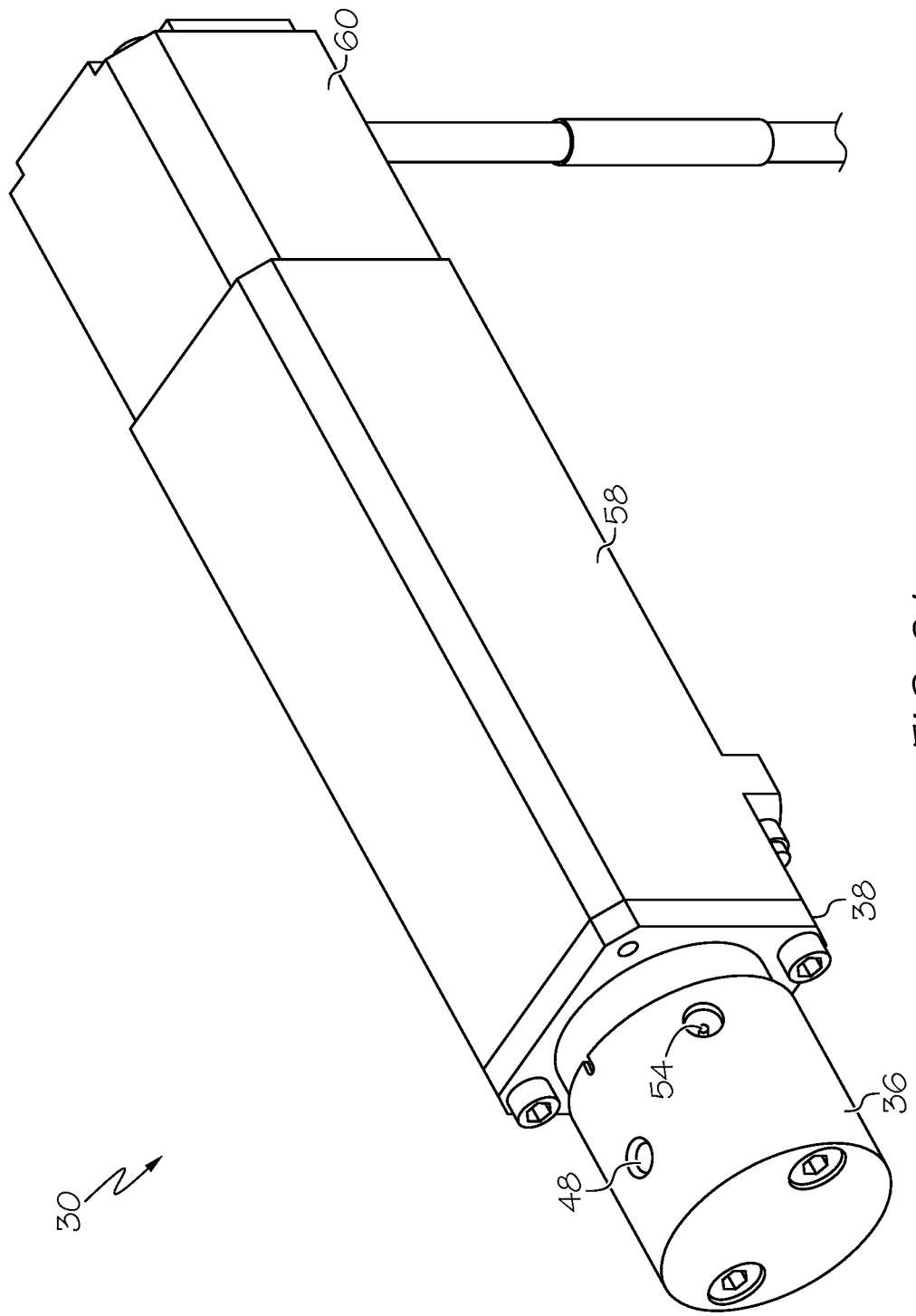

METERING PUMP FOR LIQUID CHROMATOGRAPHY

RELATED APPLICATION

This application claims the benefit of the earlier filing date of U.S. Provisional Patent Application Ser. No. 63/000,037, filed Mar. 26, 2020 and titled "Metering Pump for Liquid Chromatography," the entirety of which is incorporated herein by reference.

FIELD OF THE INVENTION

The invention relates generally to pumps used for sample metering in liquid chromatography systems. More particularly, the invention relates to a pump having a modular design and other features to enable high-pressure metering and improve serviceability.

BACKGROUND

High performance liquid chromatography (HPLC) systems and ultra-high performance liquid chromatography (UHPLC) systems often employ a sample metering pump to acquire small volumes of sample for injection into the system flow. Syringe drives maybe used but in some instances bubbles in the syringe can be difficult to purge during the system priming process. In addition, some applications can require a sample volume precision that cannot be met by conventional metering pumps.

Servicing and maintenance of metering pumps typically presents a challenge. For example, the plunger and seals in the pump head may require replacement. Disassembly of the metering pump to access these components can result in a difficult task of properly installing and aligning the replacement components. Moreover, the time required to complete servicing or preventative maintenance can be problematic, requiring long system downtime or the need for a replacement metering pump.

SUMMARY

In one aspect, a metering pump includes a pump housing, a drive nut, an anti-rotation guide pin, a lead screw and a pusher element. The pump housing has an axial bore and a slot parallel to an axis of the axial bore. The drive nut has a bore with internal threads and an opening. The drive nut disposed in the axial bore of the pump housing. The anti-rotation guide pin is at least partially disposed in the opening of the drive nut and extends into the slot of the pump housing. The lead screw has a threaded outer surface in engagement with the threaded bore of the drive nut. The pusher element comprises one of a pusher cap and a pusher jacket. The pusher element is secured to the drive nut and has a convex surface. A rotation of the lead screw imparts an axial translation of the drive nut and pusher cap.

The metering pump may include a stepper motor in mechanical communication with the lead screw. The metering pump may include a gearbox mechanically coupled to the lead screw and to the stepper motor.

The metering pump may include a plunger having a first end in contact with the convex surface of the pusher element. The plunger may include a plunger rod and a plunger hub, wherein an end of the plunger hub is in contact with the convex surface of the pusher element. The metering pump may include a guide washer affixed to the plunger hub. The guide washer may be formed of a polymer. The metering pump may include a pod head. The pod head includes a pump head and a cartridge housing. The pump head has a pump chamber to receive an end of the plunger rod and the cartridge housing is disposed between the pump head and the pump housing. The cartridge housing may have an axial cavity with a spring disposed therein. The spring is configured to apply an axial force to the plunger.

The convex surface of the pusher element may have a radius of curvature equal to a distance between the convex surface and an axial point midway along a length of an outer surface of the drive nut adjacent to a surface of the axial bore.

The metering pump may include a sensor fixed to an external surface of the housing along the slot. The sensor is configured to sense a presence of the anti-rotation guide pin at a fixed location along the slot. The sensor may be an optical sensor having an optical emitter and an optical detector configured to receive light emitted along an optical path from the optical emitter, wherein the optical detector generates a signal responsive to an interruption of the optical path by the anti-rotation guide pin.

In another aspect, a metering pump includes a guide boss, a lead screw, a first pulley, a drive nut, an anti-rotation guide pin and a pusher cap. The guide boss has an axial bore and a slot parallel to an axis of the axial bore. The lead screw is partially disposed in the axial bore and has a threaded surface and an opening. The drive nut is in mechanical communication with the first pulley. The anti-rotation guide pin is at least partially disposed in the opening of the drive nut and extends into the slot of the guide boss. The pusher cap is disposed at one end of the drive nut and has a convex surface. A rotation of the first pulley imparts a rotation to the drive nut and an axial translation to the lead screw and pusher cap.

The metering pump may include a second pulley and a pulley belt coupling the first and second pulleys. The metering pump may further include a stepper motor having a shaft coupled to the second pulley, wherein a rotation of the shaft imparts a rotation to the first and second pulleys and the drive nut.

The metering pump may include a plunger having an end in contact with the convex surface of the pusher cap. The plunger may include a plunger rod and a plunger hub, wherein an end of the plunger hub is in contact with the convex surface of the pusher cap. The metering pump may include a guide washer affixed to the plunger hub and the guide washer may be formed of a polymer. The metering pump may further include a pod head. The pod head includes a pump head having a pump chamber to receive an end of the plunger rod and a cartridge housing disposed between the pump head and the pump housing. The cartridge housing may have an axial cavity with a spring disposed therein, wherein the spring is configured to apply an axial force to the plunger.

The convex surface of the pusher cap may have a radius of curvature equal to a distance between the convex surface and an axial point midway along a length of an expanded portion of the lead screw in the axial bore of the guide boss.

The metering pump may include a sensor fixed to an external surface of the guide boss along the slot. The sensor is configured to sense a presence of the anti-rotation guide pin at a fixed location along the slot. The sensor may be an optical sensor having an optical emitter and an optical detector configured to receive light emitted along an optical path from the optical emitter, wherein the optical detector generates a signal responsive to an interruption of the optical path by the anti-rotation guide pin.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the technology.

FIGS. 2A, 2B and 2C are a top perspective view, a bottom perspective view and a cross-sectional view, respectively, of an example of a sample metering pump.

DETAILED DESCRIPTION

Figure 1:
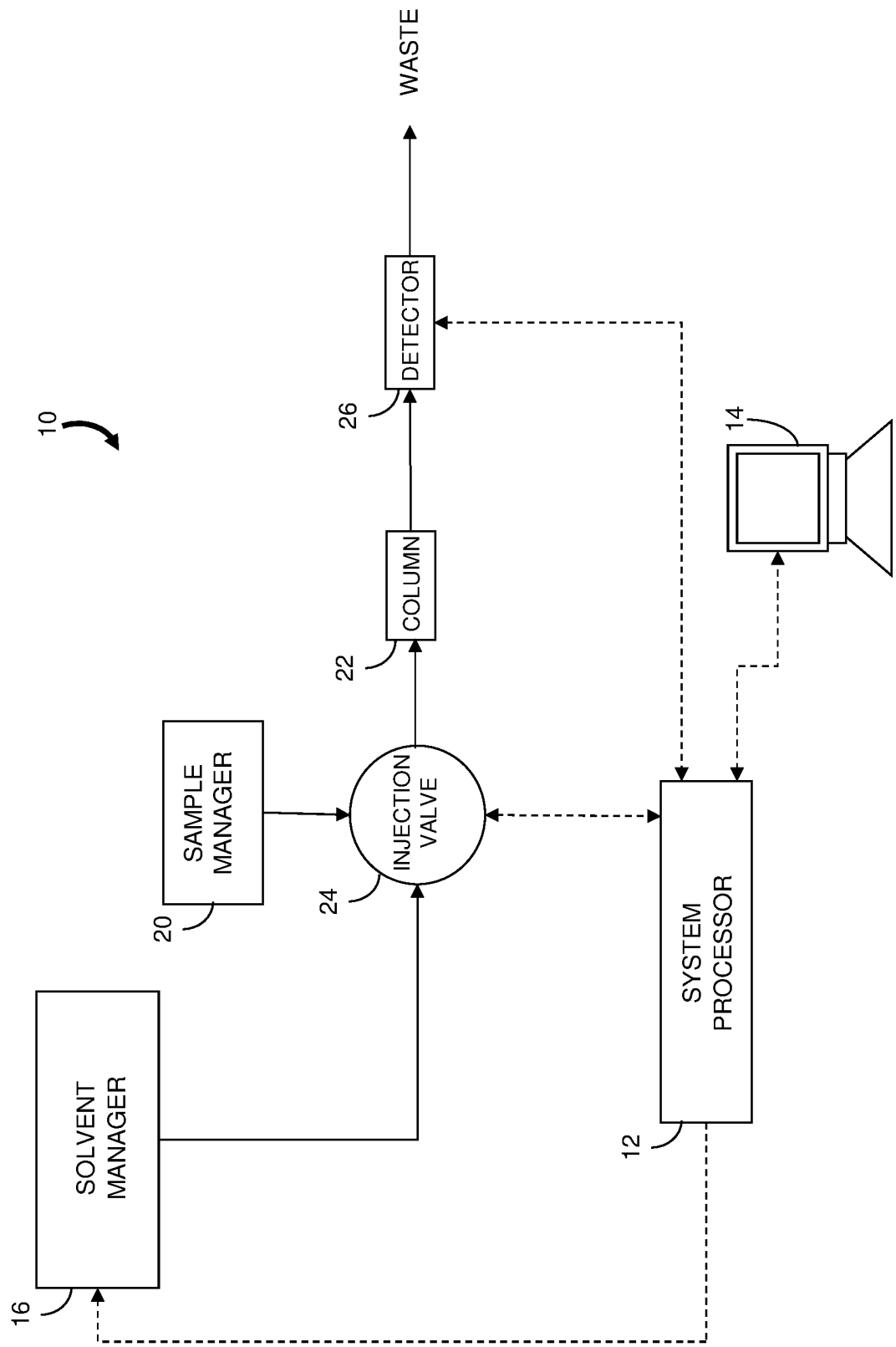
FIG. 1 is a block diagram of a liquid chromatography system that may include one of the examples of a sample metering pump described herein.

As used herein, a mobile phase is a solvent or mixture of solvents used to carry a sample and to pass through the stationary phase of a liquid chromatography system. The mobile phase may be a gradient mobile phase in which the composition of the mobile phase changes with time. The mobile phase may be referred to herein as the system flow which typically flows from the source of the mobile phase to at least the detector of the liquid chromatography system. A "sample" refers to a sample solution that contains the sample components to be injected into the system flow upstream from a chromatographic column. The sample is typically made available in a sample reservoir or sample container in the sample manager of the liquid chromatography system. The sample solution may include a sample diluent.

In brief overview, the examples described below are directed to sample metering pumps that may be used to meter precise volumes of liquid for injection in a liquid chromatography system. In some implementations, the sample metering pump is able to withstand the full system pressure (e.g., up to 125 MPa (18,000 psi)) and may, in some instances, be able to pre-compress the aspirated sample up to full system pressure before injecting. Other advantages over conventional metering pumps include improved injector precision and linearity, improved reliability and aspiration accuracy and, in some implementations, a greater sample volume range. In addition, preventive maintenance may be unnecessary. For example, sample metering pumps generally employ substantially fewer pump strokes over time when compared to pumps used to provide a continuous high-pressure solvent flow for the mobile phase of the chromatography system.

In some implementations, a modular configuration of the metering pump provides for a pod section ("head pod") and a drive section ("drive assembly") that may be separated from each other. This modular configuration results in easier serviceability. For example, replacement of the fluidic seals and/or plunger can be performed without disassembly of the assembly. Alternatively, a head pod may be replaced with another head pod so that the metering pump can be operable with little down time and so that the removed head pod can be serviced separately. The replacement head pod may be factory tested to eliminate any time that might otherwise be necessary to test a refurbished original head pod and to modify the original head pod based on those test results. Replacement of the head pod permits a quick reconfiguration of a sample manager to accommodate different operating conditions. For example, the replacement head pod may have a different plunger, seal, and pump chamber size to allow for operation at a different pressure range and acquisition of sample at different volumes with different volumetric precision.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Reference in the specification to an "example" or "implementation" means that a particular feature, structure or characteristic described in connection with the example or implementation is included in at least one example or implementation of the teaching. References to a particular example or implementation within the specification do not necessarily all refer to the same example or implementation.

FIG. 1 is a block diagram of a liquid chromatography system 10 that can be modified to practice embodiments of the method of the invention. The system 10 includes a system processor 12 (e.g., microprocessor and controller) in communication with a user interface device 14 for receiving input parameters and displaying system information to an operator. The system processor 12 communicates with a solvent manager 16 which provides one or more solvents for a mobile phase. For example, the solvent manager 16 may provide a gradient mobile phase. A sample provided by a sample manager 20 is injected into the mobile phase upstream from a chromatographic column 22 by an injection valve 24. The sample manager 20 can include a source of sample such as a sample reservoir, vial or other container that holds a volume of the sample. The sample manager 20 may include a sample metering device used to aspirate an accurate volume of sample into a sample needle from the sample source. In some instances, the sample manager 20 provides a diluted sample that includes the sample and a diluent. The chromatographic column 22 is coupled to a detector 26 which provides a signal to the system processor 12. The signal is responsive to various components detected in the eluent from the column 22. After passing through the detector 26, the system flow exits to a waste port; however, when used for fraction collection, a diverter valve is included to redirect the system flow to one or more collection vessels.

The sample metering device often provides limitations on the volume and volume accuracy of the sample injected into the system. In some instances, the fluidic network in communication with the metering device is adversely affected by bubbles, such as during the priming process when bubbles may not be sufficiently purged from the system. Moreover, serviceability is sometimes a problem as conventional metering pumps may not provide easy access to internal components. In addition, the ability to dispense the chromatographic sample at full system pressure may not be possible.

Figure 2B:
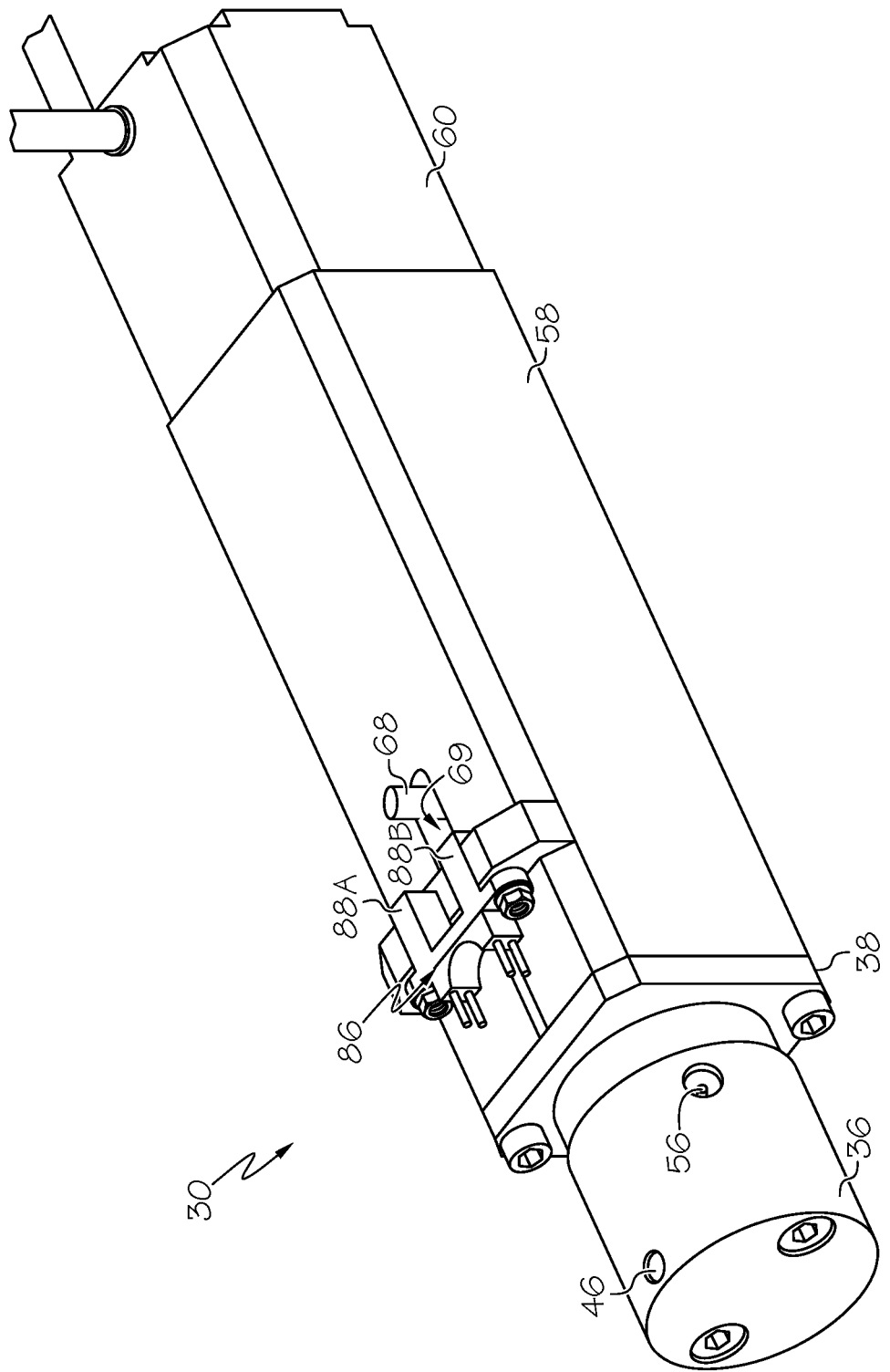
Figure 2C:
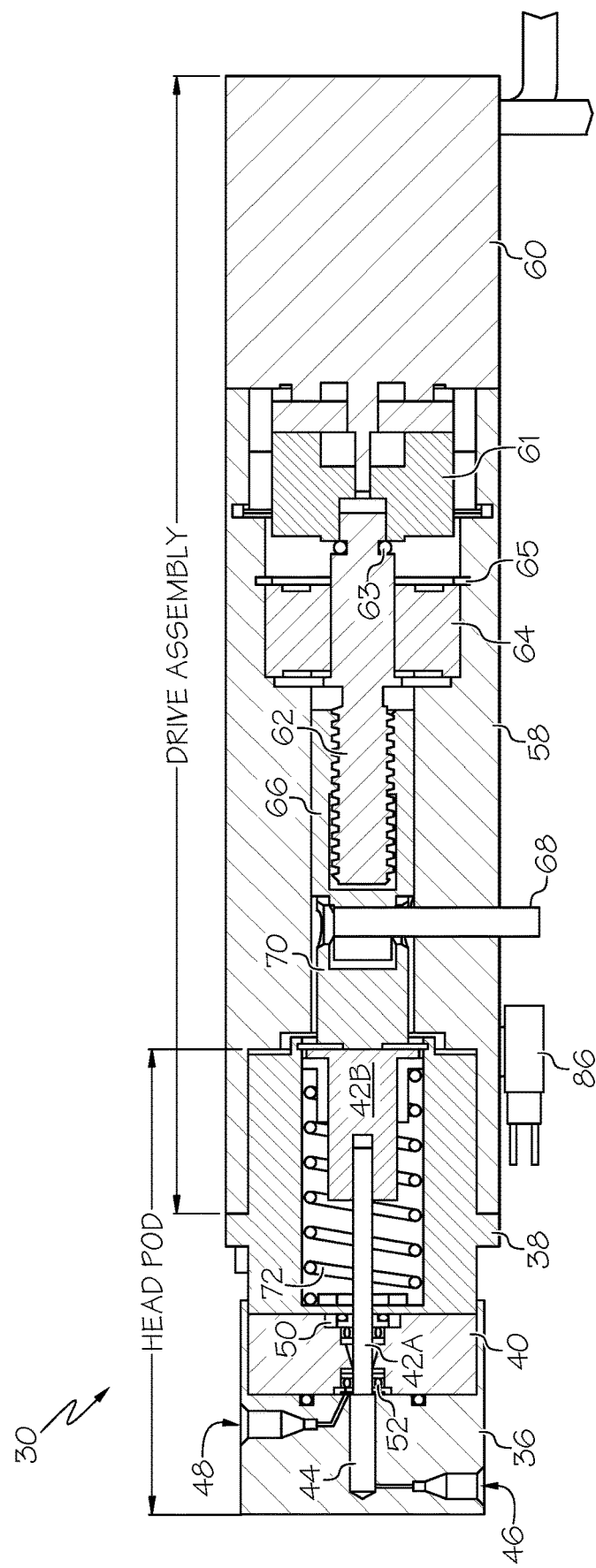

FIGS. 2A, 2B and 2C are a top perspective view, a bottom perspective view and a cross-sectional view, respectively, of one example of a sample metering pump 30. The pump 30 includes a head pod and a drive assembly. The head pod includes a pump head 36, a cartridge housing 38, a seal wash housing 40 and a plunger rod 42A and plunger hub 42B (collectively plunger 42). The plunger hub 42B includes a ceramic insert. In some embodiments, the pump head 36, cartridge housing 38 and seal wash housing 40 are made of steel and the plunger rod 42A is made of sapphire or zirconia.

The pump head 36 includes a pump chamber 44 to receive the plunger 42, a pump inlet 46 and a pump outlet 48. The seal wash housing 40 includes a first gland at one end having a first fluidic seal 50 and a second gland at an opposite end having a second fluidic seal 52. One or both fluidic seals 50 and 52 may be a spring-activated seal. For example, one or more springs may be disposed in one or more annular regions of the seal. The second seal 52 is a high-pressure seal which seals at the operating pressure of the liquid chromatography system. The seal wash housing 40 also includes an inlet 54 configured to receive a fitting to couple to tubing that conducts a wash solvent. The wash solvent is used to clean the outer surface of the plunger 42 on the lower pressure side of the high-pressure seal 52. The seal wash housing 40 further includes an outlet 56 configured to receive a fitting to couple to tubing to conduct the wash solvent away from the metering pump 30.

The drive assembly includes a pump housing 58, stepper motor 60, planetary gearbox 61, lead screw 62, angular contact bearing 64 and drive nut 66. The angular contact bearing 64 is held in place and biased against an inner surface of the housing 58 by a bearing retainer ring 65. The gearbox 61 enables a greater torque to be applied with a corresponding reduction in rotation rate. In one implementation, the gearbox provides a gearset reduction of 5:1. The lead screw 62 may have a spline feature formed at the back (right) end to interface with the gearset 61. The gearbox 61 rests against an O-ring 63 positioned on a reduced diameter portion of the lead screw 62 near the spline feature. The lead screw 62 is fixed at the spline feature to the planetary gearbox 61.

Figure 3:
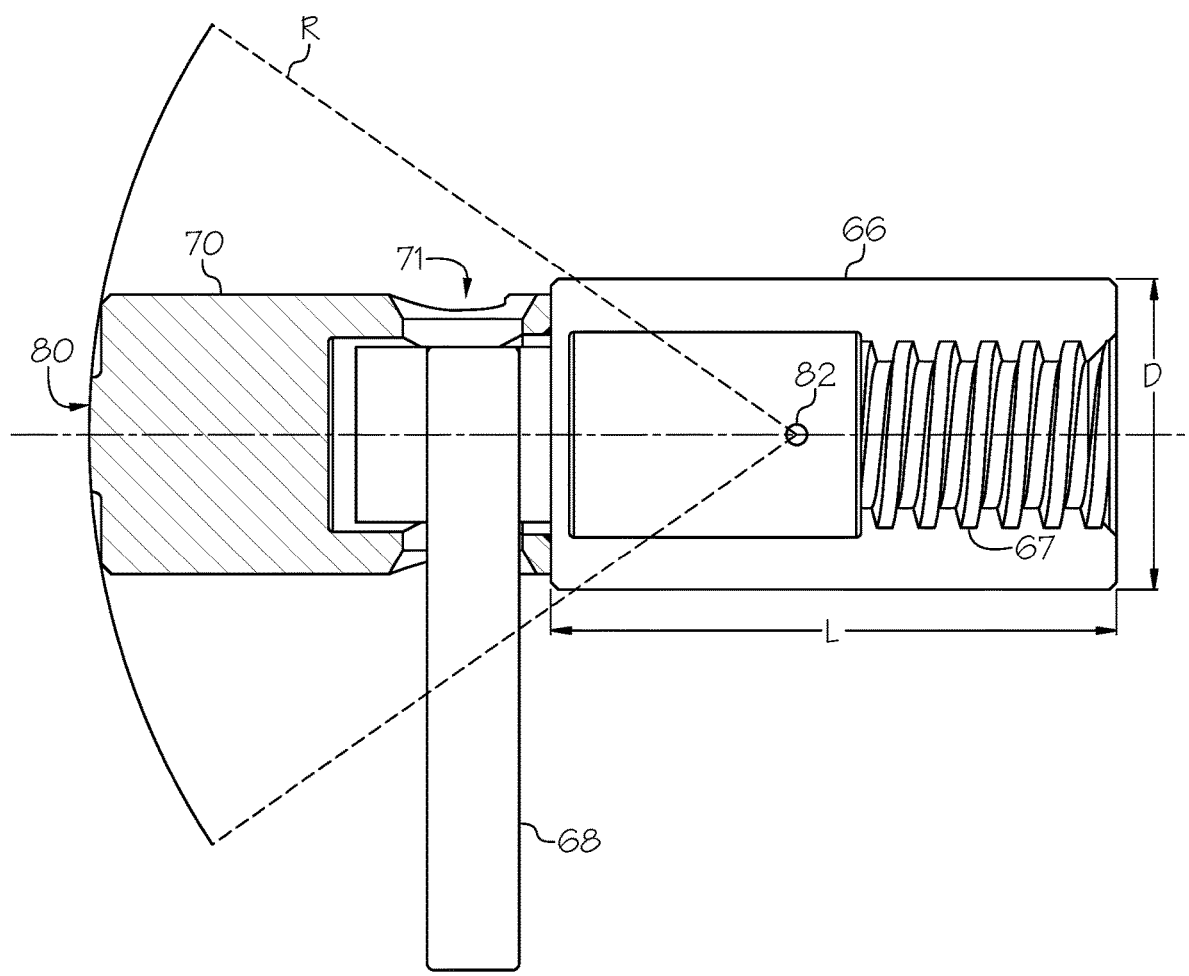
FIG. 3 shows a drive nut, pusher cap and anti-rotation guide pin for the sample metering pump of FIGS. 2A to 2C.

Referring also to FIG. 3, the drive nut 66 has an outer diameter D that is less that the bore diameter of the adjacent region of the pump housing 58. In one implementation, the drive nut 66 is formed of a plastic or other polymer. Internal threads 67 in a bore of the drive nut 66 engage the threaded outer surface of the lead screw 62. A pusher cap 70 used to apply axial force to the plunger 42 is secured at a narrowed end of the drive nut 66 that is opposite to the lead screw 62. The pusher cap 70 includes an opening to pass an anti-rotation guide pin 68 and a convex surface 80, described in more detail below, which is in contact with the plunger hub 42B. Preferably, the assembly comprising the drive nut 66 and pusher cap 70 is sufficiently stiff so as to minimize deformation during the application of axial force. In some embodiments, the pusher cap 70 is formed of steel or another stiff material and has an axial length chosen to be as large as practical to limit compression during axial load.

The pusher cap 70 has a clearance hole 71 in its side with a diameter that is greater than a diameter of the guide pin 68 and the diameter of the guide pin 68 is slightly greater than a diameter of a though hole in the narrowed end of the drive nut 66. During assembly, the pusher cap 70 is attached to the narrowed end of the drive nut 66 and then the guide pin 68 is press fit into the drive nut 66 through the clearance hole in the pusher cap 70 so that the through hole is occupied by a portion of the guide pin 68 with the remainder extending outward from one end. The extended portion of the guide pin 68 is constrained to move within a slot 69 formed in the bottom of the pump housing 58 (see FIG. 2B). The slot 69 is parallel to an axis of the housing axial bore. The width of the slot 69 is sized to be slightly greater than the outer diameter of the pin 68 and the length of the slot 69 is parallel to the longitudinal axes of the lead screw 62 and drive nut 66. The constraint imposed on the guide pin 68 by the slot 69 prevents rotation of the drive nut 66 during pump operation and consequently allows only motion in a direction parallel to the length of the slot 69. The motor 60 and planetary gearbox 61 are configured to impart a rotation to the lead screw 62 which in turn imparts a linear (axial) translation to the drive nut 66 and pusher cap 70 parallel to the length of the slot 69. The length of the slot 69 is sufficient to enable the full range of motion of the plunger 42 during pump operation.

Figure 4:
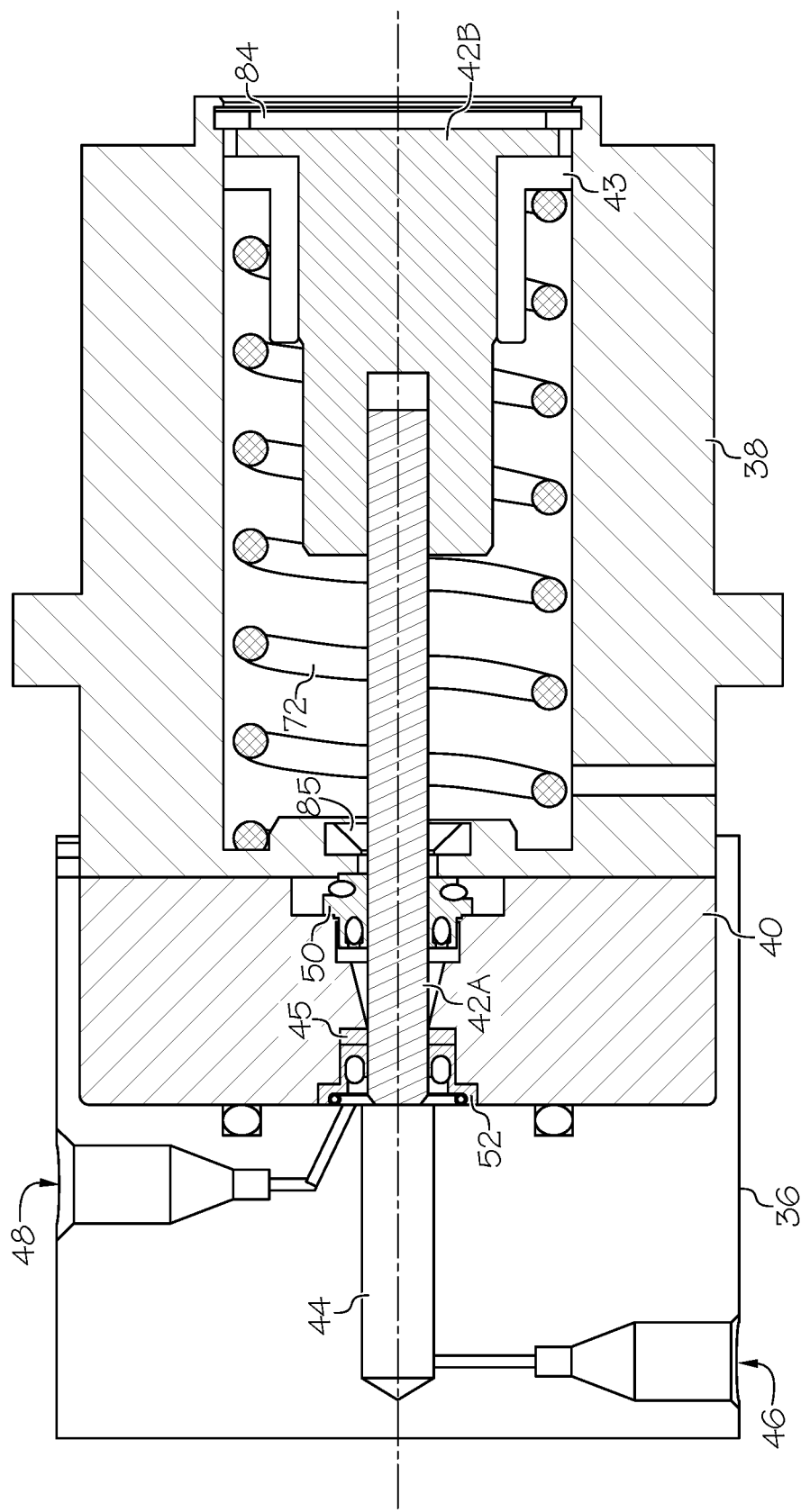
FIG. 4 is a cross-sectional view of an embodiment of a head pod for the sample metering pump of FIGS. 2A to 2C and shows the pump head, seal wash housing and cartridge housing.

Operation of the stepper motor 60 in one rotational direction results in a translation of the drive nut 66 such that the pusher cap 70 imparts a force to the plunger 42 directed along the axis of the pump housing 58. The force moves the plunger 42 further into the pump chamber 44. Rotation of the stepper motor 60 in an opposite direction results in a reverse translation such that the plunger 42 is drawn backwards, i.e., in a direction out from the pump chamber 44. The force used to draw the plunger 42 backwards is applied by a spring 72 disposed in a cavity in the cartridge housing 38 as shown in FIG. 4. The spring 72 is installed at a preload to ensure there is always sufficient spring force to overcome friction in the system, including friction between the outer diameter of the plunger rod 42A and the inner diameter of the seals 50 and 52 and to maintain contact between the pusher cap 70 and the back of the plunger hub 42B when the plunger 42 is drawn backwards. The cartridge housing 38 further includes an assembly guide ring 85 pressed into an opening at the left side where the plunger 42 extends from the cavity through the first fluidic seal 50 into the wash housing 40. The assembly guide ring 85 prevents scratching of the plunger 42 during assembly when proper alignment of the plunger 42 may be difficult due to the compression of the spring 72 and the obstructed view of the assembler. During operation, the plunger 42 is guided by the high-pressure fluidic seal 52 and a polymer guide washer 43 which is pressed onto the plunger hub 42B.

One end of the spring 72 engages the plunger hub 42B and is maintained inside the cavity under compression by an internal retention ring 84. The spring 72 maintains contact of the plunger hub 42B with the contact surface 80 of the pusher cap 70 without requiring it to be securely attached to the pusher cap 70. Advantageously, this lack of a secure attachment enables the head pod to be detached from the drive assembly without the plunger 42 coming loose. The head pod may be separated from the drive assembly to perform maintenance or otherwise service the head pod. For example, replacement of the low-pressure seal 50 and/or high-pressure seal 52 can be performed on the removed head pod.

The separability of the head pod and drive assembly provides advantages over solvent manager pump actuators which may include a drive mechanism that includes a ball detent and a plunger having a ball neck to engage the ball detent. In the conventional configurations, the physical connection between the ball detent and the ball neck prevents their separation. Moreover, if the drive assembly is laterally misaligned with respect to the head pod in the conventional metering pump, the plunger is laterally translated from its ideal position and there may be a small angular misalignment of the plunger with respect to the pump longitudinal axis. This misalignment can cause a degradation in operation.

Unlike some chromatographic system pumps such as mobile phase solvent pumps, the metering pump 30 does not operate with a high number of cycles. For example, only a single cycle, or a small number of cycles, depending on sample manager configuration, may be used to acquire sample for injection. The volume of liquid moved by the plunger 42 and the load on the metering pump 30 are dependent on the size of the plunger 42. For example, if operating the metering pump 30 at 70 MPa (10,000 psi) with a 0.30 cm (0.125 in.) diameter plunger and a 100 μL pump stroke volume, a force of approximately 140 pounds may be used. This force is sufficient to overcome pump friction and the force applied by the spring 72. However, if high precision for small sample volumes is desired, it may be preferable to operate the metering pump 30 using the same drive assembly with a head pod that has a smaller plunger and smaller pump chamber. In addition, smaller plunger sizes also allow a decrease in the drive force required to move fluid at higher pressures and therefore decrease the torque requirements for the motor 60. By way of an example, the plunger 42 may have a 2.0 mm (0.08 in.) diameter, the pump stroke volume may be 40 μL and the metering pump 30 may be operated at pressures up to or exceeding 125 MPa (18,000 psi). The replacement head pod may provide better precision because the displacement volume per motor step is smaller.

FIG. 3 is an expanded view of the pusher cap 70 showing a convex surface 80 that engages the flat surface at the back end of the plunger hub 42B. The drive nut 66 is constrained to axial movement in the axial bore of the housing 58. Due to the clearance between the outer diameter of the drive nut 66 and the diameter of the axial bore, there is a potential for the drive nut 66 to have a small tilt with respect to the housing longitudinal axis. Consequently, the tilt of the drive nut 66 may rotate about a point 82 that is approximately midway along a length L of its outer surface. If the radius of curvature R of the surface 80 equals the distance between the convex surface 80 and the midway point 82, any tilt about point 82 will not change the lateral position of the point of contact on the flat surface of the plunger 42. In addition, if the pusher cap 70 is misaligned laterally, the direction of the force applied by the pusher cap 70 on the plunger 42 remains unchanged.

Referring again to FIGS. 2B and 2C, an optical sensor 86 is attached to the bottom surface of the housing 58 near one end of the slot 69 used to constrain the anti-rotation guide pin 68. The optical sensor includes two side extensions 88A and 88B (generally 88) wherein one side extension 88 includes an optical emitter and the other side extension 88 includes an optical detector. The light emitted by the optical emitter is sensed by the optical detector when the intervening gap is not occupied by the guide pin 68. As illustrated, the guide pin 68 is near an end of the slot 69 away from the optical sensor 86. As the drive nut 66 and pusher cap 70 move the plunger 42 into the pump chamber 44, the guide pin 68 moves within the slot 69 toward the optical sensor 86. As the plunger 42 reaches its maximum inward position inside the pump chamber 44, the edge of the guide pin 68 interrupts the optical path between the optical emitter and optical detector. The decrease in the light power incident on the optical detector causes a signal change associated with a reference position for the plunger 42. Other plunger positions can then be determined based on the number of stepper motor steps from the reference position. For example, the reference position may be the end of travel position for the plunger 42. In alternative embodiments, the optical sensor 86 may be at a different position such as at the opposite end of the slot 69. In other embodiments, a different type of sensor may be used to determine the position of the plunger 42. For example, an encoder that defines a reference position against a physical stop can be used as an alternative means to control position.

Figure 5:
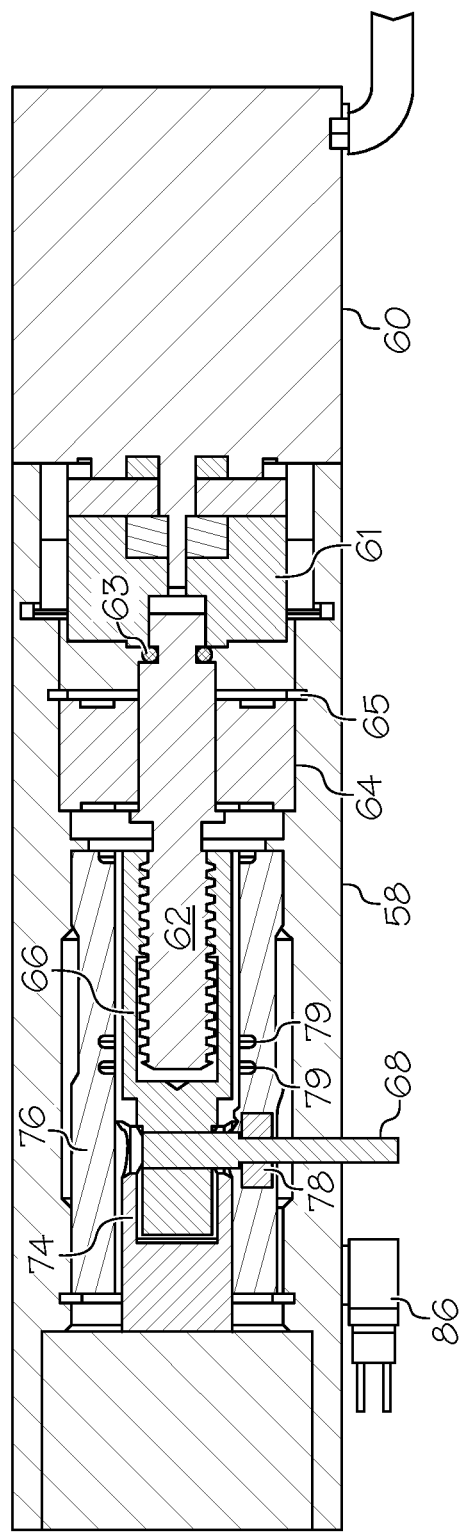
FIG. 5 is a cross-sectional illustration of an embodiment of a drive assembly that may be used as an alternative to the drive assembly of FIGS. 2A to 2C.

FIG. 5 is a cross-sectional illustration of an embodiment of a drive assembly that may be used in place of the drive assembly shown in FIGS. 2A to 2C. Instead of the polymer drive nut 66 moving in the axial bore of the housing 58, the illustrated embodiment makes use of additional components inside the axial bore. More specifically, instead of using a pusher cap 70 as a pusher element (i.e., an element used to urge the plunger 42 into the pump chamber 44), a pusher jacket 74 is used. The pusher jacket 74 is a substantially cylindrical component having a convex contact surface 80' at one end. The pusher jacket 74 is press fit onto the drive nut 66 through the other jacket end. The pusher jacket 74 circumferentially encloses the drive nut 66. Preferably, the pusher jacket 74 is made of a hardened stainless steel. A bronze bushing 76 is secured in the axial bore of the pump housing 58. During pump operation, the pusher jacket 74 and enclosed drive nut 66 move axially through the bronze bushing 76. An anti-rotation guide pin 68 extends from the drive nut 66 through the pusher jacket 74 and through an anti-rotation bearing 78 in a side wall of the bronze bushing 76.

The use of bronze and stainless steel allows for tighter dimensional manufacturing tolerances and therefore the gap between the pusher jacket 74 and bronze bushing 76 can be less than the gap between the pusher cap 70 and housing 58 in the embodiment shown in FIGS. 2A to 2C. Preferably, the pusher jacket 74 has a diamond-like carbon (DLC) coating to improve hardness. Grease or another lubricant may be applied to a portion of the outer surface of the pusher jacket 74. One or more circumferential grooves 79 may be formed in the inner surface of the bronze bushing 76 to accept and hold excess lubricant.

In various embodiments described above with respect to FIG. 4, the guide washer 43 slides along the inner bore of the cartridge housing 38 during motion of the plunger 42. There is a small clearance between the bore inner diameter and the outer surface of the plunger 42. Similarly, there is a small clearance between the inner diameter of a backup ring 45 that is adjacent to the high pressure seal 52. The backup ring 45 may be made, for example, from a hard plastic. The combination of the guide washer 43 and the backing plate 45 establish the alignment of the plunger 42 and prevent any significant tilting with respect to the axis of linear motion.

Figure 6:
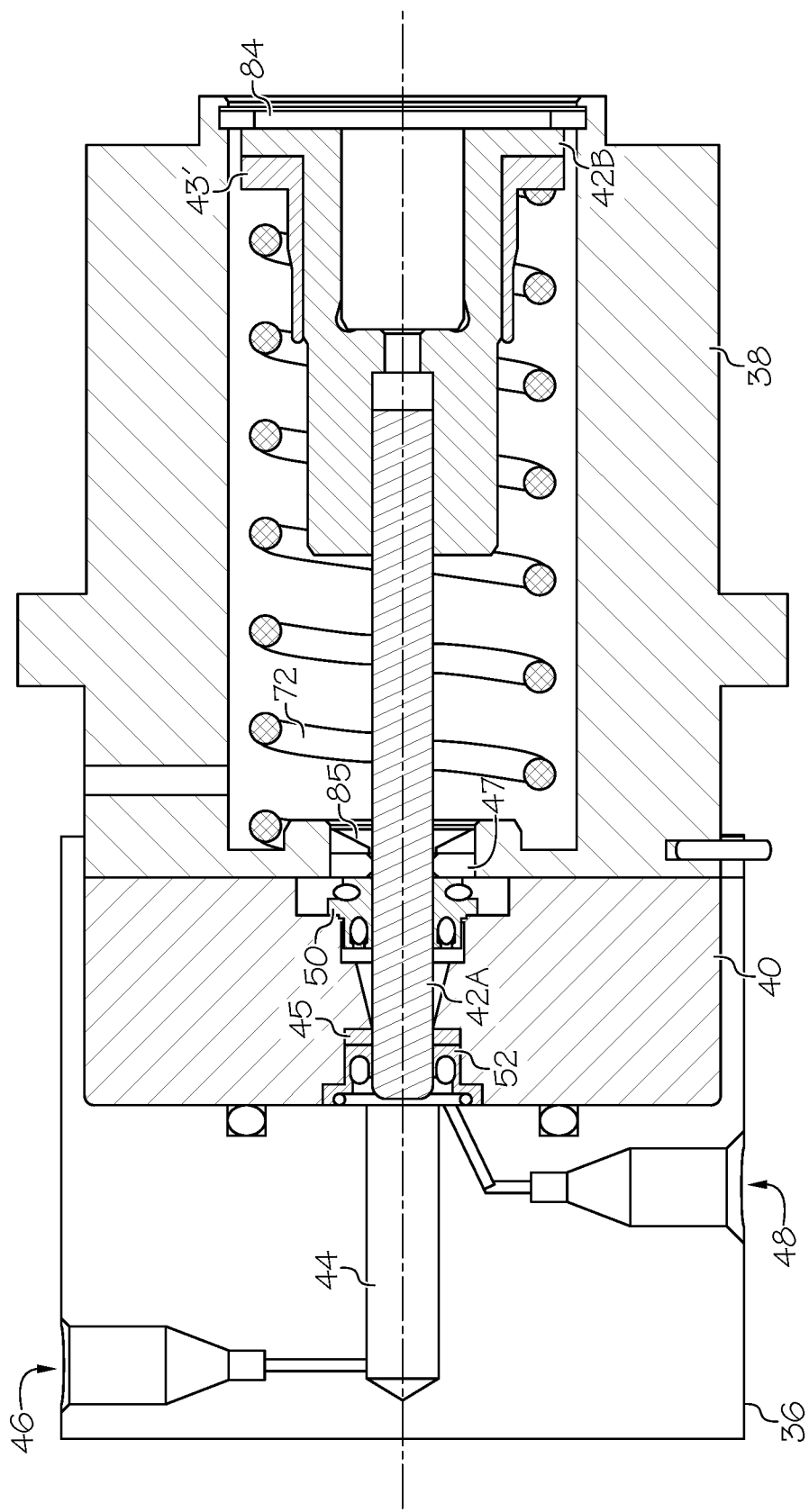
FIG. 6 is an alternative embodiment to the pump head shown in FIG. 4.

FIG. 6 shows an alternative embodiment to the pump head shown in FIG. 4. Although the plunger 42 is supported at one location by the backup ring 45, the guide washer 43' does not provide a means for aligning plunger 42. Instead, a guide bushing 47 is pressed into the cartridge housing 38. In some embodiments, the guide bushing 47 is made of a plastic and in other embodiments it is made of a ceramic material such as zirconia. Like the opening in the backup ring 45, the diameter of the opening in the guide bushing 47 is closely matched to the diameter of the plunger 42 and the clearance may be, for example, on the order of 0.001 in. Thus, the backup ring 45 and guide bushing 47 establish the alignment of the plunger 42 and prevent any significant variation in the angular orientation of the plunger 42 with respect to the axis of plunger motion.

In the illustrated embodiment, the manufacturing methods allow the surfaces that rub against each other to be formed as highly smooth surfaces. For example, the plunger 42 may be made of sapphire and have a smooth surface and the guide bushing 47 may be made of zirconia. Thus, the wear and friction characteristics due to these hard surfaces may be significantly improved.

Figure 7:
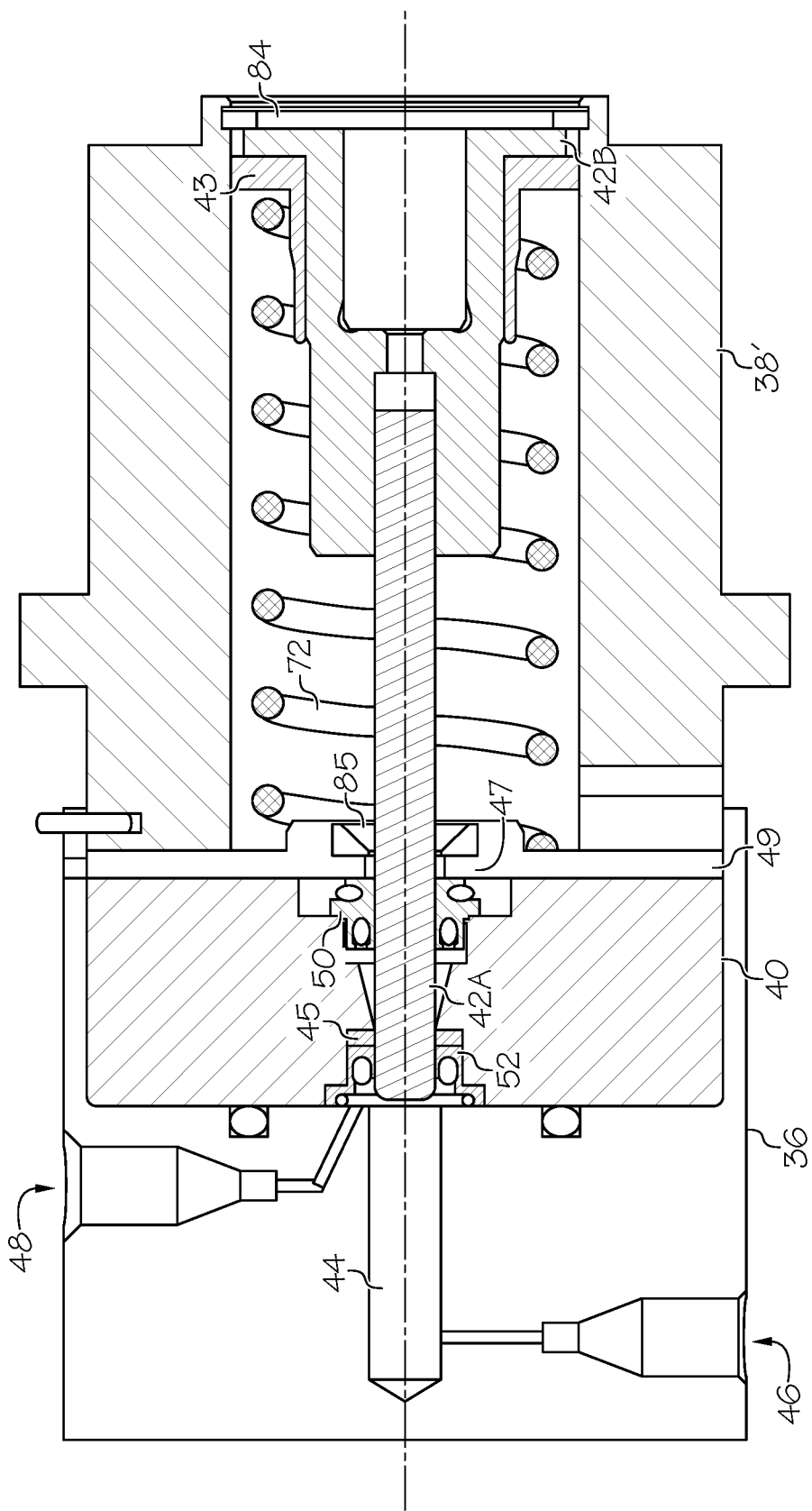
FIG. 7 is another alternative embodiment to the pump head shown in FIG. 4.

FIG. 7 shows another alternative embodiment to the pump head shown in FIG. 4. In this illustrated embodiment, the cartridge housing 38' is made of aluminum coated with polytetrafluoroethylene (PTFE). A retention plate 49 made of stainless steel is used to hold the low pressure seal 50 in place in the seal wash housing 40. The seal 50 may be wet by solvent therefore the retention plate 49 may be in contact with the solvent. The coating provides reduced friction with respect to the internal moving parts and provides an additional benefit of protecting the cartridge housing 38' against contact with solvents. The stainless steel retention plate 49 prevents a strong solvent that might otherwise be capable of degrading the coating and reaching the aluminum material from having the opportunity to reach the coated surface of the cartridge housing 38'.

The PTFE coating is applied generally to all surfaces of the cartridge housing 38'. In one example, the aluminum cartridge housing 38' is anodized to create an aluminum oxide layer before applying the PTFE to the housing surface. Advantageously, the bore of the cartridge housing 38' is coated with PTFE and therefore, instead of sliding on a stainless steel surface, the polymer guide washer 43 slides along the low friction surface of the hard-coated PTFE aluminum surface.

Figure 8A:
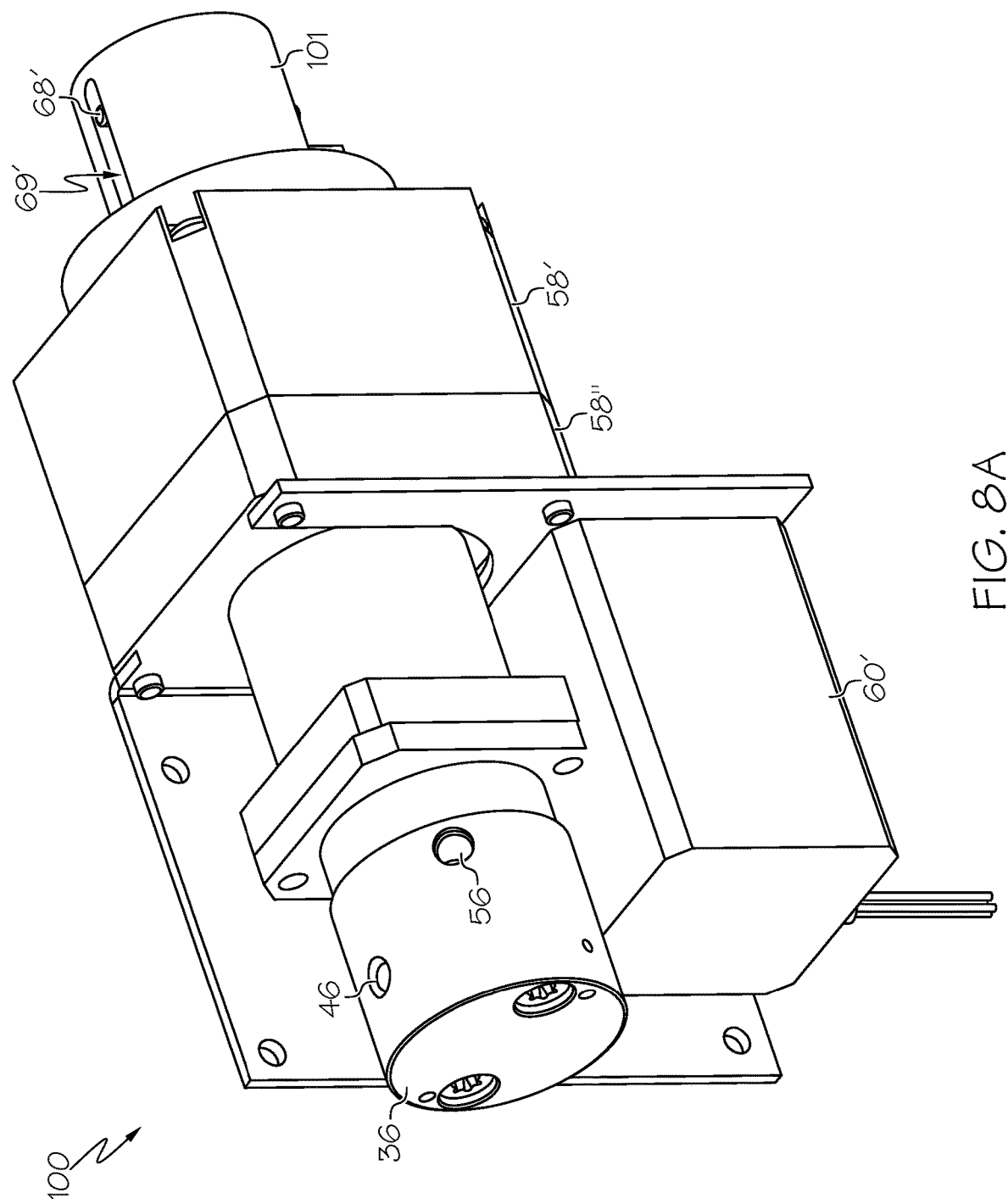
FIGS. 8A and 8B are a perspective view and a cross-sectional view, respectively, of another example of a metering pump.
Figure 8B:
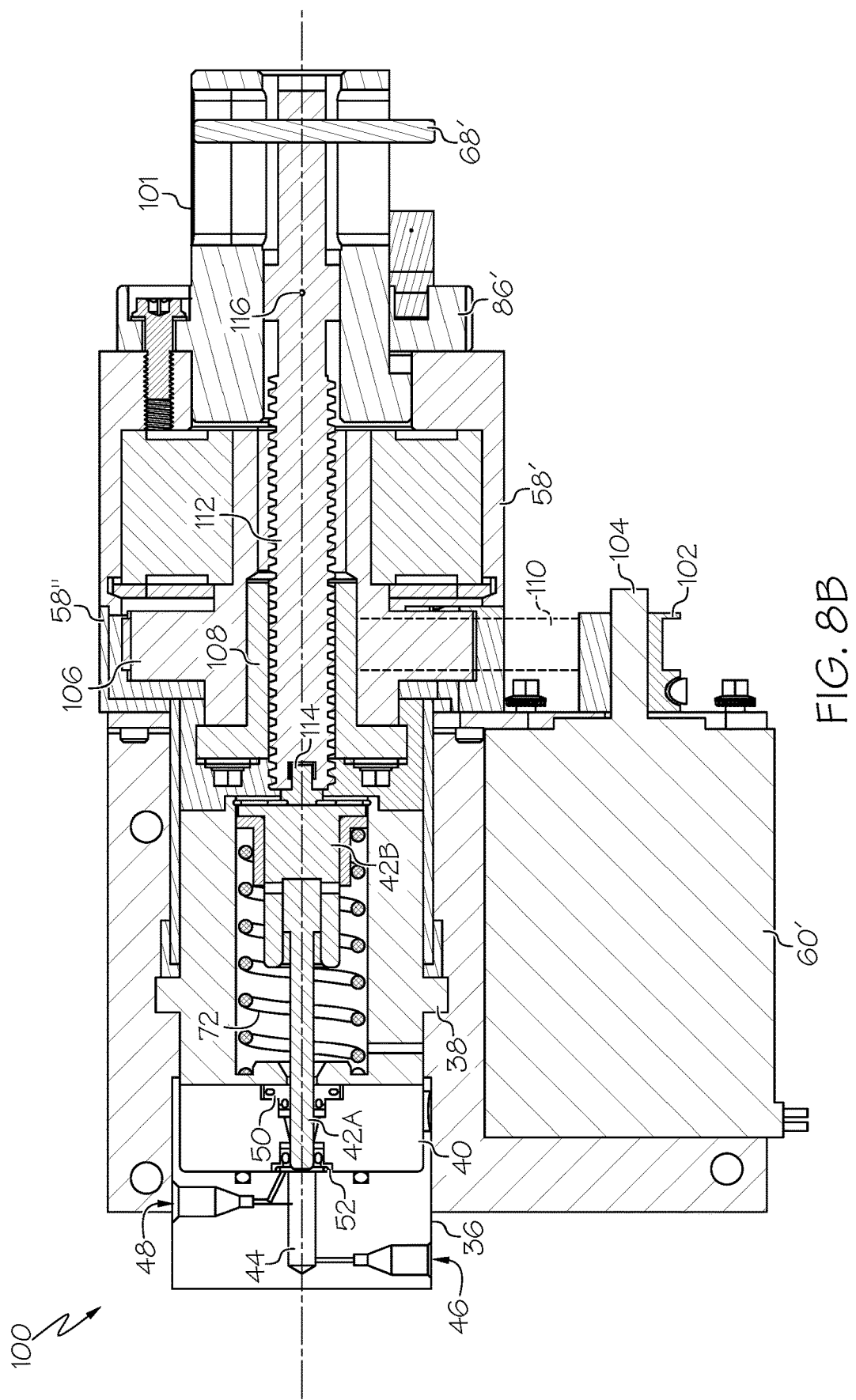

FIG. 8A and FIG. 8B are a perspective view and a cross-sectional view, respectively, of another example of a metering pump 100. Components and features similar to those for the metering pump 30 described above are identified with similar reference numbers. Primed reference numbers are used to indicate components in the metering pump 100 having similar functions to counterpart components having unprimed reference numbers in the metering pump 30 but which may otherwise have different shapes, sizes and/or features. Unlike the metering pump 30 described above, the metering pump 100 includes a housing having two housing parts 58' and 58" for fabrication purposes. In addition, there is a guide boss 101 at the right end that includes a slot 69' in which an anti-rotation guide pin 68' extends into for achieving axial translation of a lead screw 112, as further described below. The lead screw 112 is aligned, in part, in an axial bore in the guide boss 101. In one embodiment, the guide boss 101 is made of plastic.

Unlike the metering pump 30 which has an inline drive configuration, the illustrated metering pump 100 has an offset drive configuration. Instead of a stepper motor 60 and planetary gearbox 61 that are both axially in line with the housing 58 and various other components, the stepper motor 60' is arranged to the side of the pump housing 58' and is coupled through a belt and pulley system and other intervening components to drive the plunger 42. Although this offset configuration results in a wider pump footprint, the length of the metering pump 100 is shorter and therefore may be a desirable configuration for some applications. In one non-limiting numerical example, the length of the metering pump 100 is approximately five centimeters (two inches) shorter than the length of the metering pump 30 described above.

The belt and pulley system includes a first pulley 102 secured to the shaft 104 of the stepper motor 60' and a second pulley 106 secured to a drive nut 108. Dashed lines 110 indicate the location of a pulley belt used to transfer mechanical power from the stepper motor 60' to the drive nut 108. The mechanical advantage is determined by a ratio of the engagement surfaces of the two pulleys 106 and 102. In one example, the ratio is 5:1. The engagement surfaces may be smooth. Alternatively, the engagement surfaces may be toothed and the belt 110 may have an inner surface configured to engage teeth on each pulley 102 and 106.

The drive nut 108 is free to rotate inside the axial bore in the pump housing 58' and includes internal threads in a bore that engage the threaded outer surface of the lead screw 112. The anti-rotation guide pin 68' extends out from an opening in the lead screw 112 into the slot 69' in the guide boss 101 which is parallel to an axis of the axial bore in the housing 58 and an axial bore in the guide boss 101. Thus, as the rotation of the stepper motor shaft 104 is transferred by the belt and pulley system to cause a rotation of the drive nut 108, the lead screw 112 translates linearly along the bore axis and applies a linear force to move the plunger 42 into the pump chamber 44. The spring 72 in the cartridge housing 38 provides force to withdraw (push) the plunger 42 out from the pump chamber 44 when the stepper motor shaft 104 rotates in the opposite direction and causes the lead screw 112 to translate in the opposite direction.

An optical sensor 86' is used to determine a plunger axial position (e.g., an end of travel axial position) based on interruption of light through an optical path, similar to the sensor 86 described above with respect to metering pump 30.

A pusher cap 114 is affixed to the end of the lead screw 112 which is made of steel. In this instance, axial compression is of lesser concern due to the metal construction, therefore the pusher cap 114 is a substantially smaller sized component that is press fit into the end of the lead screw 112. Preferably, the pusher cap 114 is made of a harder steel than the lead screw 112. The pusher cap includes a convex surface to push against the back surface of the plunger 42. In one embodiment, the radius of curvature of the convex surface is substantially equal to the distance between the midpoint 116 of the expanded portion of the lead screw 112 inside the axial bore of the guide boss 101 and the location to the left in the figure where the lead screw threads constrain the lead screw 112 in the drive nut 108. Thus, the radius of curvature is greater than that for the convex surface 80 of the pusher cap 70 for the inline metering pump 30.

While the technology has been shown and described with reference to specific embodiments, it should be understood by those skilled in the art that various changes in form and detail may be made therein without departing from the scope of the claims.

What is claimed is:

1. A metering pump, comprising:
 a pump housing having an axial bore and a slot parallel to an axis of the axial bore;

a drive nut having a bore with internal threads and having an opening, the drive nut disposed in the axial bore of the pump housing;

an anti-rotation guide pin at least partially disposed in the opening of the drive nut and extending into the slot of the pump housing;

a lead screw having a threaded outer surface in engagement with the threaded bore of the drive nut;

a pusher element secured to the drive nut and having a convex surface; and a plunger having an end in contact with the convex surface of the pusher element, wherein a rotation of the lead screw imparts an axial translation to the drive nut, pusher element and plunger.

2. The metering pump of claim 1 further comprising a stepper motor in mechanical communication with the lead screw.

3. The metering pump of claim 1 further comprising a gearbox mechanically coupled to the lead screw and to the stepper motor.

4. The metering pump of claim 1 wherein the plunger comprises a plunger rod and a plunger hub, wherein an end of the plunger hub is in contact with the convex surface of the pusher element.

5. The metering pump of claim 4 further comprising a pod head, the pod head comprising:
  a pump head having a pump chamber to receive an end of the plunger rod; and
  a cartridge housing disposed between the pump head and the pump housing.

6. The metering pump of claim 5 wherein the cartridge housing has an axial cavity with a spring disposed therein, the spring configured to apply an axial force to the plunger.

7. The metering pump of claim 4 further comprising a guide washer affixed to the plunger hub.

8. The metering pump of claim 7 wherein the guide washer is formed of a polymer.

9. The metering pump of claim 1, wherein the convex surface has a radius of curvature equal to a distance between the convex surface and an axial point midway along a length of an outer surface of the drive nut adjacent to a surface of the axial bore.

10. The metering pump of claim 1 further comprising a sensor fixed to an external surface of the housing along the slot, the sensor configured to sense a presence of the anti-rotation guide pin at a fixed location along the slot.

11. The metering pump of claim 10 wherein the sensor is an optical sensor having an optical emitter and an optical detector configured to receive light emitted along an optical path from the optical emitter and wherein the optical detector generates a signal responsive to an interruption of the optical path by the anti-rotation guide pin.

12. A metering pump, comprising:
  a guide boss having an axial bore and a slot parallel to an axis of the axial bore;
  a lead screw partially disposed in the axial bore and having a threaded surface and an opening;
  a first pulley;
  a drive nut in mechanical communication with the first pulley;
  an anti-rotation guide pin at least partially disposed in the opening of the lead screw and extending into the slot of the guide boss;
  a pusher cap disposed at one end of the drive nut and having a convex surface; and
  a plunger having an end in contact with the convex surface of the pusher cap,
  wherein a rotation of the first pulley imparts a rotation to the drive nut and an axial translation to the lead screw and pusher cap.

13. The metering pump of claim 12 further comprising a second pulley and a pully belt coupling the first and second pulleys.

14. The metering pump of claim 13 further comprising a stepper motor having a shaft coupled to the second pulley, wherein a rotation of the shaft imparts a rotation to the first and second pulleys and the drive nut.

15. The metering pump of claim 12 wherein the plunger comprises a plunger rod and a plunger hub and wherein an end of the plunger hub is in contact with the convex surface of the pusher cap.

16. The metering pump of claim 15 further comprising a pod head, the pod head comprising:
  a pump head having a pump chamber to receive an end of the plunger rod; and
  a cartridge housing disposed between the pump head and the pump housing.

17. The metering pump of claim 16 wherein the cartridge housing has an axial cavity with a spring disposed therein, the spring configured to apply an axial force to the plunger.

18. The metering pump of claim 15 further comprising a guide washer affixed to the plunger hub.

19. The metering pump of claim 18 wherein the guide washer is formed of a polymer.

20. The metering pump of claim 12, wherein the convex surface has a radius of curvature equal to a distance between the convex surface and an axial point midway along a length of an expanded portion of the lead screw in the axial bore of the guide boss.

21. The metering pump of claim 12 further comprising a sensor fixed to an external surface of the guide boss along the slot, the sensor configured to sense a presence of the anti-rotation guide pin at a fixed location along the slot.

22. The metering pump of claim 21 wherein the sensor is an optical sensor having an optical emitter and an optical detector configured to receive light emitted along an optical path from the optical emitter and wherein the optical detector generates a signal responsive to an interruption of the optical path by the anti-rotation guide pin.

* * * * *